United States Patent
Durham

(10) Patent No.: US 9,769,309 B1
(45) Date of Patent: Sep. 19, 2017

(54) SYSTEM FOR DISABLING A MOBILE PHONE IN A VEHICLE

(71) Applicant: Christine Durham, Seattle, WA (US)

(72) Inventor: Christine Durham, Seattle, WA (US)

(*) Notice: Subject to any disclaimer, the term of this patent is extended or adjusted under 35 U.S.C. 154(b) by 0 days.

(21) Appl. No.: 15/144,994

(22) Filed: May 3, 2016

(51) Int. Cl.
*H04M 1/725* (2006.01)
*H04W 4/00* (2009.01)
*H04W 52/02* (2009.01)

(52) U.S. Cl.
CPC ..... *H04M 1/72577* (2013.01); *H04M 1/7253* (2013.01); *H04W 4/001* (2013.01); *H04W 52/0229* (2013.01); *H04M 2250/02* (2013.01)

(58) Field of Classification Search
CPC ......... H04W 8/22; H04W 4/008; H04W 4/22; H04W 4/001; H04W 4/046; H04W 4/027; H04M 1/72577; H04L 67/12
See application file for complete search history.

(56) References Cited

U.S. PATENT DOCUMENTS

| | | |
|---|---|---|
| 8,774,842 B2 | 7/2014 | Jones |
| 8,989,820 B2 | 3/2015 | Czaja |
| 2012/0214463 A1* | 8/2012 | Smith ............... H04M 1/72577 455/418 |
| 2013/0072174 A1 | 3/2013 | Enty |
| 2015/0029031 A1 | 1/2015 | Pank |
| 2015/0172450 A1 | 6/2015 | Singhal |
| 2015/0256999 A1* | 9/2015 | Doorandish ...... H04M 1/72577 455/419 |

* cited by examiner

*Primary Examiner* — Nizar Sivji

(57) ABSTRACT

The system for disabling a mobile phone in a vehicle is adapted for use with an automobile. The system for disabling a mobile phone in a vehicle is further adapted for use with a cellular phone. The system for disabling a mobile phone in a vehicle is a Bluetooth beacon that transmits a Bluetooth signal when engine of the automobile is running. A background application loaded on the cellular phone continuously monitors for a signal from the beacon and, when it senses the signal from the beacon the application shuts down the all wireless communication, with the exception of Bluetooth communication, and visual displays from the cellular phone until: 1) the beacon stops transmitting; or, 2) the cellular phone connects to a Bluetooth based hands free device. The system for disabling a mobile phone comprises a beacon and an application.

8 Claims, 3 Drawing Sheets

SYSTEM FOR DISABLING A MOBILE PHONE IN A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of wireless communication networks and network management, more specifically, a wireless beacon used for connecting and disconnecting a network element to a wireless communication network.

SUMMARY OF INVENTION

The system for disabling a mobile phone in a vehicle is adapted for use with an automobile. The system for disabling a mobile phone in a vehicle is further adapted for use with a cellular phone. The system for disabling a mobile phone in a vehicle is a Bluetooth beacon that transmits a Bluetooth signal when engine of the automobile is running. A background application loaded on the cellular phone continuously monitors for a signal from the beacon and, when it senses the signal from the beacon the application shuts down the all wireless communication, with the exception of Bluetooth communication, and visual displays from the cellular phone until: 1) the beacon stops transmitting; or, 2) the cellular phone connects to a Bluetooth based hands free device.

These together with additional objects, features and advantages of the system for disabling a mobile phone in a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the system for disabling a mobile phone in a vehicle in detail, it is to be understood that the system for disabling a mobile phone in a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the system for disabling a mobile phone in a vehicle.

It is therefore important that the claims be regarded as including such equivalent construction insofar as they do not depart from the spirit and scope of the system for disabling a mobile phone in a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
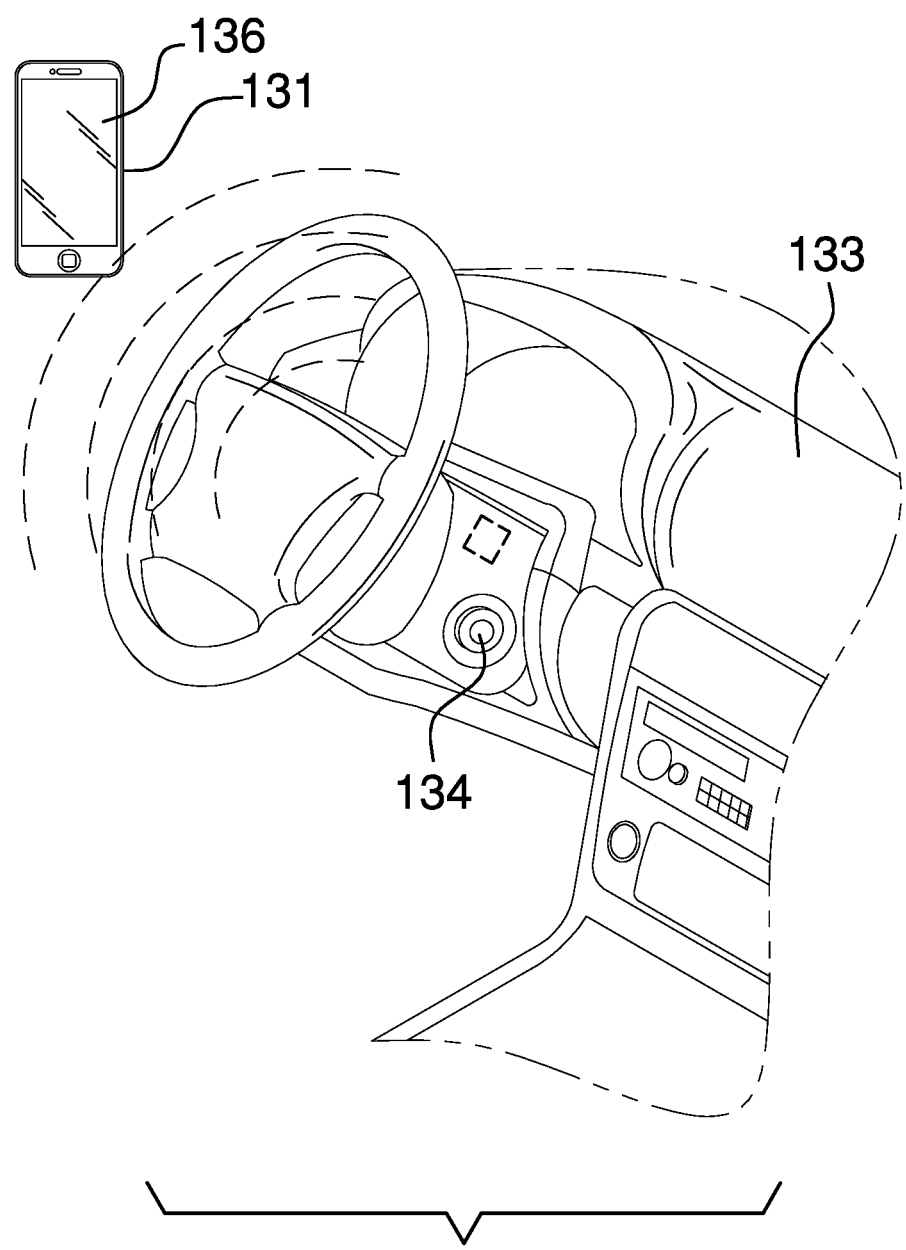
FIG. 1 is a perspective view of an embodiment of the disclosure.
Figure 2:
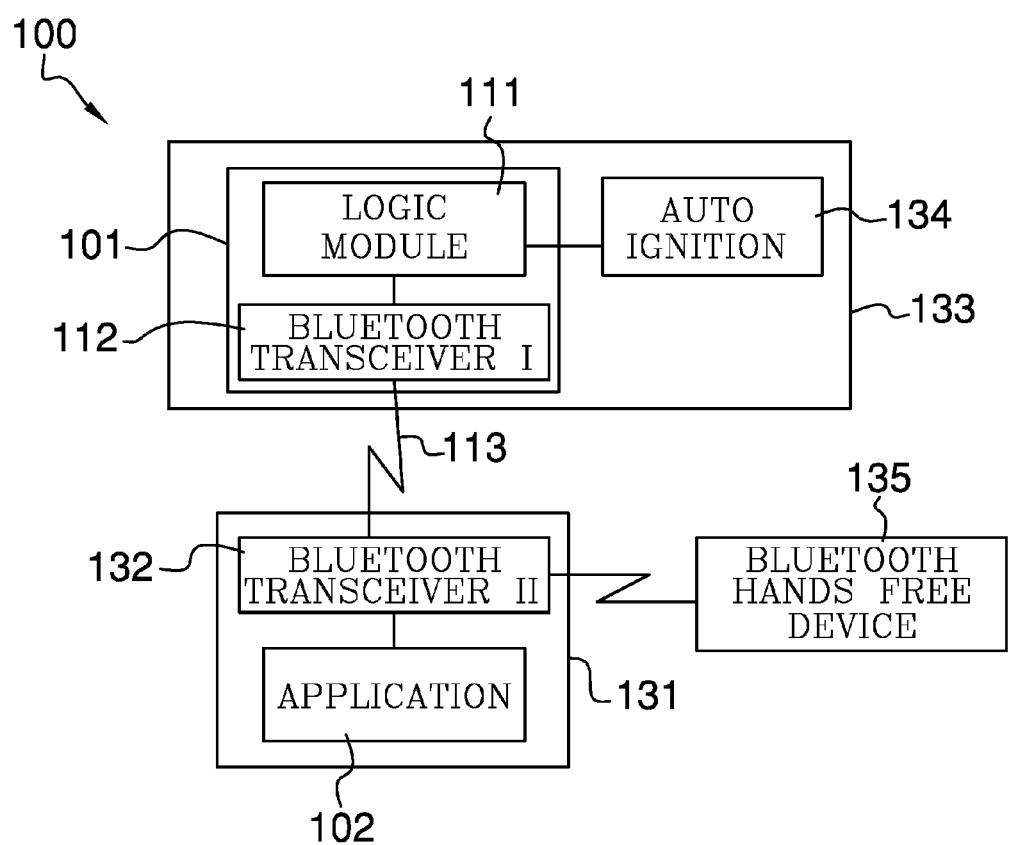
FIG. 2 is a block diagram of an embodiment of the disclosure.
Figure 3:
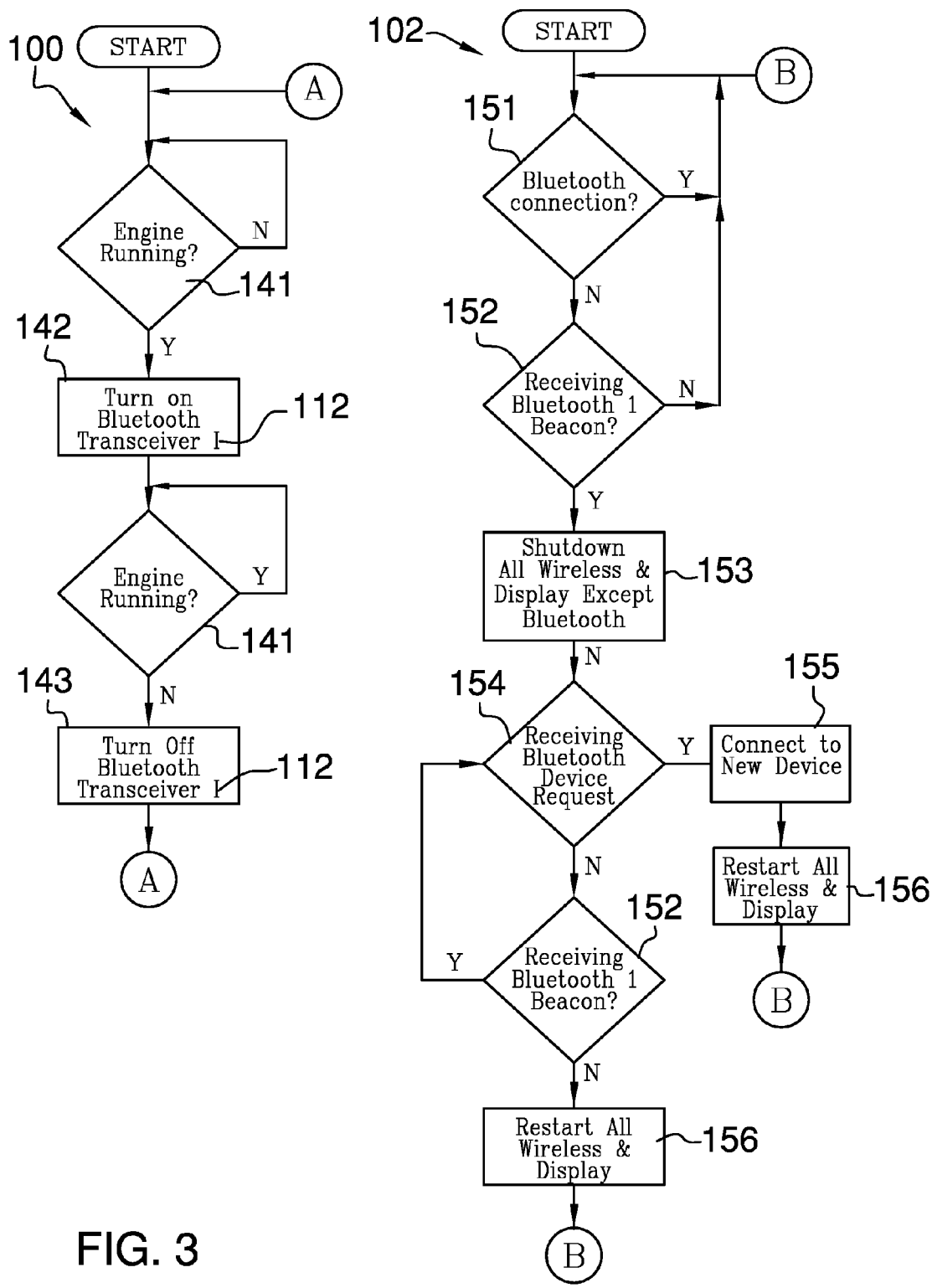
FIG. 3 is a flowchart of an embodiment of the disclosure.

Detailed reference will now be made to a first potential embodiment of the disclosure, which is illustrated in FIGS. 1 through 3.

The system for disabling a mobile phone in a vehicle 100 (hereinafter invention) comprises a beacon 101 and an application 102. The invention 100 is adapted for use with an automobile 133. The invention 100 is further adapted for use with a cellular phone 131. The invention 100 is a Bluetooth based beacon 101 that transmits a Bluetooth signal 113 when engine of the automobile 133 is running. An application 102 loaded on the cellular phone 131 runs continuously in the background and monitors for a signal 113 from the beacon 101. When the application 102 senses the signal 113 from the beacon 101, the application 102 shuts down 153 the all wireless communication, with the exception of Bluetooth communication, and visual displays from the cellular phone 131 until: 1) the beacon 101 stops transmitting; or, 2) the cellular phone 131 connects 155 to a Bluetooth based hands free device.

The beacon 101 is an electronic device that is installed within the automobile 133. The beacon 101 further comprises a logic module 111 and a first Bluetooth transceiver 112. The logic module 111 is a commercially available programmable device that is used to control and operate the device. Depending on the specific design and the selected components, the logic module 111 can be a separate component within the device or the functions of the logic module 111 can be incorporated into another component within the device. The first Bluetooth transceiver 112 is a commercially available electronic communications device that uses Bluetooth protocols to communicate with the cellular phone 131. In the first potential embodiment of the disclosure, the logic module 111 and the first Bluetooth transceiver 112 were combined into a single device known as an "RFduino" that is an Arduino based microcontroller that is produced by RF Digital Corporation. Methods to assemble, program and operate Arduino based microcontrollers and their associated shields are well known and documented in the electrical arts.

The beacon 101 is wired into the electrical system of the automobile 133. As shown most clearly in FIGS. 2 and 3, the logic module 111 monitors the ignition 134 of the automobile 133. As shown most clearly in FIG. 3, the logic module 111 monitors 141 the ignition 134 to determine whether the engine is running. If the logic module 111 determines the engine is running, the logic module 111 turns on 142 the first Bluetooth transceiver 112 to signal 113 that the automobile 133 is in operation. The logic module 111 then continues to monitor 141 the ignition 134 to determine whether the engine remains running. When the logic module 111 determines that the engine is no longer running, the logic module 111 turns off 143 the first Bluetooth transceiver 112.

The application 102 is a programmed set of instructions that is loaded on to the cellular phone 131 to allow the cellular phone 131 to interface with the beacon 101. In order to interface with the beacon 101, the cellular phone 131 must be equipped a second Bluetooth transceiver 132 and a second logic module capable of using the application 102 as an instruction set. It is believed by the applicant that all cellular phones 131 currently on the market meet these requirements. Methods to develop and implement applications on cellular phones 131 are well known and documented in the engineering and software arts.

The application 102 is intended to run continuously as a background process of the cellular phone 131. The operation of the application 102 is described in this paragraph. The application 102 monitors the cellular phone 131 to check whether the cellular phone 131 is connected 151 to a Bluetooth hands free device 135. If the cellular phone 131 is attached to a Bluetooth hands free device 135, the application 102 continues to monitor that the connection 151 is maintained. If the connection 151 does not exist, the application 102 checks to see if it is receiving 152 a signal 113 from the from the first Bluetooth transceiver 112. If there is no signal 113, the application 102 continues in a loop that monitors for a Bluetooth connection 151 or a signal 113 from the first Bluetooth transceiver 112. If the application 102 detects a signal 113 from the first Bluetooth transceiver 112 the application 102 then shuts down 153: 1) all wireless communication except for Bluetooth connections; and, 2) the audio and visual displays 136 of the cellular phone 131. The application 102 then monitors to see if a Bluetooth hands free device 135 is attempting to establish 154 a connection with the cellular phone 131. If a Bluetooth hands free device 135 is attempting to establish 154 a connection with the cellular phone 131, the application 102 establishes the Bluetooth connection 155 and restarts 156 all wireless communications and displays. If a Bluetooth hands free device 135 is not attempting to establish 154 a connection with the cellular phone 131, then the application 102 checks to see if it is receiving 152 a signal 113 from the from the first Bluetooth transceiver 112. If there is a signal 113, the application 102 continues in a loop that monitors for a Bluetooth connection establishment 154 request and then for the signal 113 from the first Bluetooth transceiver 112. If the application 102 no longer detects the signal 113 from the first Bluetooth transceiver 112, the application 102 restarts 156 all wireless communications and displays and then returns to the initial loop of monitoring for Bluetooth connections 151 and for a single from the first Bluetooth transceiver 112

The operation of the invention 100 is automatic once the beacon 101 is installed in an automobile 133 and the application 102 is installed in a cellular phone 131.

The following definitions were used in this disclosure:

Application or App: As used in this disclosure, an application or app is a self-contained piece of software that is especially designed or downloaded for use with a personal data device.

Automobile: As used in this disclosure, an automobile is a road vehicle that that specializes in carrying passengers and light cargo loads. This definition is specifically intended to include vehicles generally referred to as pickup trucks, vans, and minivans.

Bluetooth: As used in this disclosure, Bluetooth is a standardized communication protocol that is used to wirelessly interconnect electronic devices.

Logic Module: As used in this disclosure, a logic module is a programmable device that accepts digital and analog inputs, processes the digital and analog inputs according to previously stored instruction and to provide the results of these instructions as digital or analog outputs.

Transceiver: As used in this disclosure, a transceiver is a device that is used to transmit and receive radio signals.

Vehicle: As used in this disclosure, a vehicle is a device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An communication auxiliary comprising:
   a beacon and an application;
      wherein the communication auxiliary is for use with an automobile;
      wherein the communication auxiliary is for use with a cellular phone;
      wherein the application is loaded on the cellular phone;
      wherein the beacon is adapted to be installed in the automobile;
      wherein the beacon is a Bluetooth based beacon;
      wherein the beacon transmits a signal when an engine of the automobile is running;
      wherein the beacon is an electronic device;
      wherein the beacon further comprises a logic module and a first Bluetooth transceiver;

wherein the logic module is connected to the first Bluetooth transceiver;
wherein the logic module is a programmable electronic device;
wherein the first Bluetooth transceiver is an electronic communications device that uses Bluetooth protocols;
wherein the first Bluetooth transceiver is linked to the cellular phone;
wherein the beacon is wired into the electrical system of the automobile;
wherein the application is a programmed set of instructions that are loaded on to the cellular phone;
wherein the cellular phone implements the programmed set of instructions;
wherein the application monitors the beacon;
wherein the logic module is connected to the ignition of the automobile;
wherein the logic module monitors the ignition of the automobile;
wherein when the logic module determines that the engine is running the logic module the logic module generates a signal through the first Bluetooth transceiver;
wherein when the application detects the signal generated through the first Bluetooth transceiver all non-Bluetooth communication protocols and user interfaces are turned off;
wherein the application is a programmed set of instructions that are loaded on to the cellular phone;
wherein the application checks whether the cellular phone is connected to a Bluetooth hands free device;
wherein if the application determines that the cellular phone is connected to the Bluetooth hands free device the application continues to monitor the that the connection to the Bluetooth hands free device is maintained;
wherein the application checks for a signal from the first Bluetooth transceiver;
wherein if a signal is detected from the first Bluetooth transceiver and a connection does not exist to a Bluetooth hands free device the application shuts down all wireless communication except for Bluetooth connections;
wherein if a signal is detected from the first Bluetooth transceiver and a connection does not exist to a Bluetooth hands free device the application shuts down all audio and visual displays of the cellular phone.

2. The communication auxiliary according to claim 1 wherein the application runs continuously as a background process on the cellular phone.

3. The communication auxiliary according to claim 2 wherein the first Bluetooth transceiver is an electronic communications device that uses Bluetooth protocols.

4. The communication auxiliary according to claim 3 wherein the first Bluetooth transceiver is linked to the cellular phone.

5. The communication auxiliary according to claim 4 wherein the beacon is wired into the electrical system of the automobile.

6. An communication auxiliary comprising:
a beacon and an application;
wherein the communication auxiliary is adapted for use with an automobile;
wherein the communication auxiliary is adapted for use with a cellular phone;
wherein the application is loaded on the cellular phone;
wherein the beacon is adapted to be installed in the automobile;
wherein the beacon further comprises a logic module and a first Bluetooth transceiver;
wherein the logic module is connected to the first Bluetooth transceiver;
wherein the first Bluetooth transceiver is an electronic communications device that uses Bluetooth protocols;
wherein the logic module is a programmable electronic device;
wherein the logic module logic module monitors the ignition of the automobile to determine whether the engine is running;
wherein if the logic module determines the engine is running the logic module turns on the first Bluetooth transceiver in order to transmit the signal;
wherein if the logic module determines that the engine is not running the logic module turns off the first Bluetooth transceiver in order to discontinue transmission of the signal;
wherein the application runs continuously as a background process on the cellular phone;
wherein the application is a programmed set of instructions that are loaded on to the cellular phone;
wherein the application checks whether the cellular phone is connected to a Bluetooth hands free device;
wherein if the application determines that the cellular phone is connected to the Bluetooth hands free device the application continues to monitor the that the connection to the Bluetooth hands free device is maintained;
wherein the application checks for a signal from the first Bluetooth transceiver; wherein if a signal is detected from the first Bluetooth transceiver and a connection does not exist to a Bluetooth hands free device the application shuts down all wireless communication except for Bluetooth connections;
wherein if a signal is detected from the first Bluetooth transceiver and a connection does not exist to a Bluetooth hands free device the application shuts down all audio and visual displays of the cellular phone;
wherein the application is a programmed set of instructions that are loaded on to the cellular phone;
wherein the application checks whether the cellular phone is connected to a Bluetooth hands free device;
wherein if the application determines that the cellular phone is connected to the Bluetooth hands free device the application continues to monitor the that the connection to the Bluetooth hands free device is maintained;
wherein the application checks for a signal from the first Bluetooth transceiver;
wherein if a signal is detected from the first Bluetooth transceiver and a connection does not exist to a Bluetooth hands free device the application shuts down all wireless communication except for Bluetooth connections;
wherein if a signal is detected from the first Bluetooth transceiver and a connection does not exist to a Bluetooth hands free device the application shuts down all audio and visual displays of the cellular phone.

7. The communication auxiliary according to claim 6 wherein the application runs continuously as a background process on the cellular phone.

8. The communication auxiliary according to claim 7 wherein the beacon is wired into the electrical system of the automobile.

* * * * *